United States Patent
Sanii et al.

(10) Patent No.: US 7,719,729 B2
(45) Date of Patent: May 18, 2010

(54) ANAMORPHIC RECORDING METHOD AND APPARATUS

(75) Inventors: Babak Sanii, Davis, CA (US); James R. Burgess, Richmond, CA (US)

(73) Assignee: Pixar, Emeryville, CA (US)

( * ) Notice: Subject to any disclaimer, the term of this patent is extended or adjusted under 35 U.S.C. 154(b) by 1596 days.

(21) Appl. No.: 10/981,307

(22) Filed: Nov. 3, 2004

(65) Prior Publication Data

US 2006/0072072 A1 Apr. 6, 2006

Related U.S. Application Data

(60) Provisional application No. 60/615,138, filed on Sep. 30, 2004.

(51) Int. Cl.
*H04N 1/04* (2006.01)
*G11C 13/00* (2006.01)

(52) U.S. Cl. .................. 358/487; 365/106

(58) Field of Classification Search ......... 358/487, 358/1.16, 1.17, 909.1; 438/14, 458; 365/106, 365/118, 119, 127, 153; 359/20, 198.1; 348/14, 348/64, 98, 458; 257/232, 221, 229, 620, 257/685, 797; 250/458.1, 459.1, 492.1; 356/326
See application file for complete search history.

(56) References Cited

U.S. PATENT DOCUMENTS

| | | | |
|---|---|---|---|
| 3,865,738 A | 2/1975 | Lente | |
| 4,314,154 A | 2/1982 | Minoura et al. | |
| 4,509,819 A | 4/1985 | Sherman et al. | |
| 4,947,039 A | 8/1990 | Lawson et al. | |
| 5,035,476 A | 7/1991 | Ellis et al. | |
| 5,097,356 A | 3/1992 | Paulsen | |
| 5,185,676 A | 2/1993 | Nishiberi | |
| 5,430,666 A | 7/1995 | DeAngelis et al. | |
| 5,532,873 A | 7/1996 | Dixon | |
| 5,576,562 A * | 11/1996 | Konuma | 257/232 |
| 5,579,064 A | 11/1996 | Vetter | |
| 5,831,757 A * | 11/1998 | DiFrancesco | 359/198.1 |
| 6,034,804 A | 3/2000 | Bashkansky et al. | |
| 6,057,967 A | 5/2000 | Takahashi et al. | |
| 6,134,002 A | 10/2000 | Stimson et al. | |
| 6,816,145 B1 * | 11/2004 | Evanicky | 345/102 |

* cited by examiner

*Primary Examiner*—Saeid Ebrahimi Dehkordy
(74) *Attorney, Agent, or Firm*—Townsend and Townsend and Crew LLP

(57) ABSTRACT

A method for a film transfer device includes receiving a digital image in the film transfer device, wherein the digital image comprises a plurality of square pixels, wherein the digital image comprises a first number of pixels in a horizontal direction and a second number of pixels in a vertical direction, and wherein the digital image comprises a non-anamorphic version of an image, and optically converting the digital image into an optical output image to film media in the film transfer device, wherein the optical output image is associated with a plurality of non-square pixels, wherein the optical output image is associated with the first number of pixels in the horizontal direction and the second number of pixels in the vertical direction, and wherein the optical output image comprises an anamorphic version of the image.

20 Claims, 6 Drawing Sheets

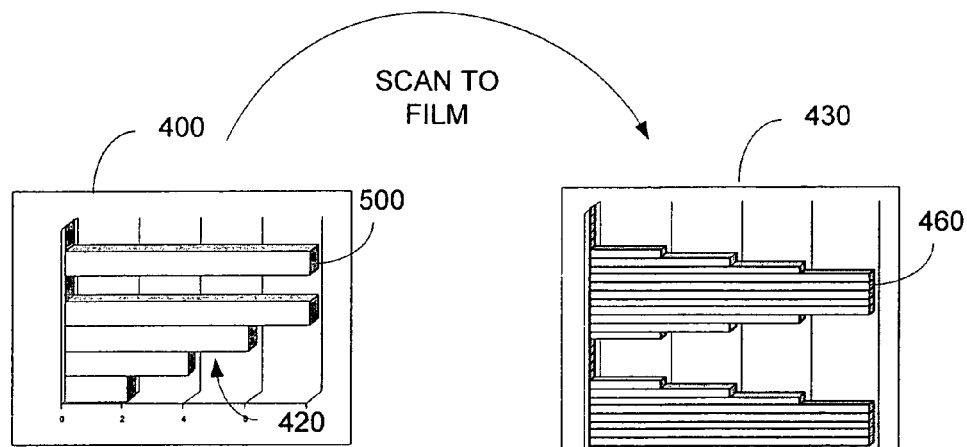
FIG. 6A
FIG. 6B
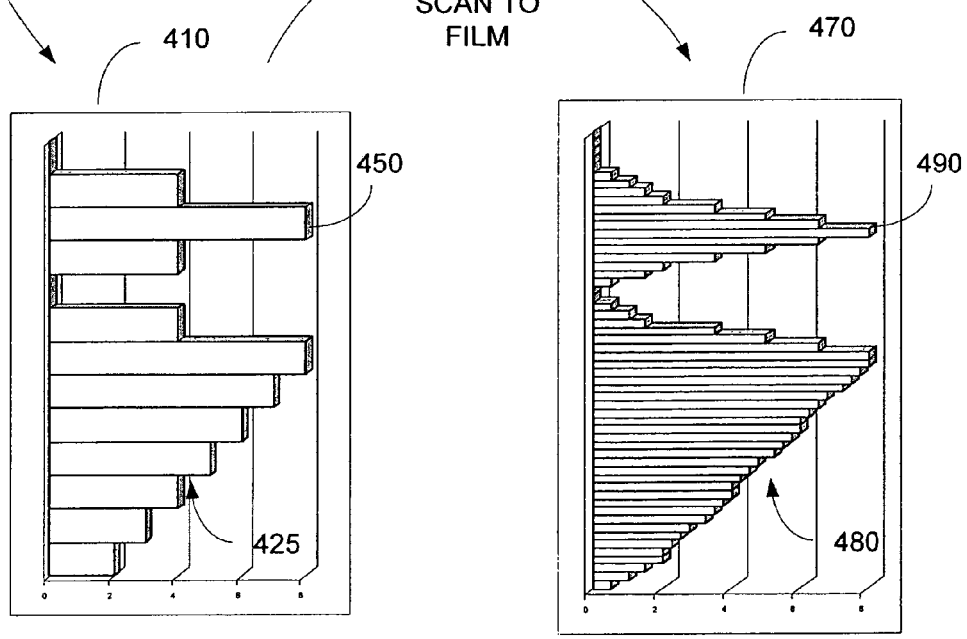
FIG. 6C
FIG. 6D

ANAMORPHIC RECORDING METHOD AND APPARATUS

CROSS-REFERENCES TO RELATED APPLICATIONS

The present invention incorporates by reference for all purposes Application No. 60/493,539, filed Aug. 8, 2003, entitled Flat Panel Digital Film Recorder and Method, and U.S. Pat. No. 6,628,442, issue date Sep. 30, 2003.

BACKGROUND OF THE INVENTION

The present invention relates to image to film transfer. More particularly, the present invention relates to techniques and apparatus for efficient recording of images to film media.

Throughout the years, movie makers have often tried to tell stories involving make-believe creatures, far away places, and fantastic things. To do so, they have often relied on animation techniques to bring the make-believe to "life." Two of the major paths in animation have traditionally included, drawing-based animation techniques and stop motion animation techniques.

Drawing-based animation techniques were refined in the twentieth century, by movie makers such as Walt Disney and used in movies such as "Snow White and the Seven Dwarfs" (1937) and "Fantasia" (1940). This animation technique typically required artists to hand-draw (or paint) animated images onto a transparent media or cels. After painting, each cel would then be captured or recorded onto film as one or more frames in a movie.

Stop motion-based animation techniques typically required the construction of miniature sets, props, and characters. The filmmakers would construct the sets, add props, and position the miniature characters in a pose. After the animator was happy with how everything was arranged, one or more frames of film would be taken of that specific arrangement. Stop motion animation techniques were developed by movie makers such as Willis O'Brien for movies such as "King Kong" (1933). Subsequently, these techniques were refined by animators such as Ray Harryhausen for movies including "Mighty Joe Young" (1948) and Clash Of The Titans (1981).

With the wide-spread availability of computers in the later part of the twentieth century, animators began to rely upon computers to assist in the animation process. This included using computers to facilitate drawing-based animation, for example, by painting images, by generating in-between images ("tweening"), and the like. This also included using computers to augment stop motion animation techniques. For example, physical models could be represented by virtual models in computer memory, and manipulated.

One of the pioneering companies in the computer aided animation (CA) industry was Pixar Incorporated. Pixar developed both computing platforms specially designed for CA, and animation software now known as RenderMan®. By moving to CA, Pixar was faced with additional challenges. One such challenge was how to accurately and effectively transfer CA images onto film.

As one means of recording an image on film, light is selectively introduced to the film in different areas over time, such that the effect of the combined exposures is a composite image. In one known arrangement, a laser beam is focused upon a frame of film. The laser beam is utilized to record a single pixel of an image onto the film. The laser beam is selectively directed at different areas of the frame of film in scan line sequential fashion to generate the composite image. In such an arrangement, beams of red, green and blue light are directed at the frame of film so that a color image is recorded by the film. The process of directing the laser beam at the film must be done with utmost precision or else the resultant image will suffer from visible defects.

In addition, in order for the image to have high resolution, the number of individual pixels or spots on the film which are individually exposed must be very large. The number of individually exposed pixels or spots on a frame of film may be 4000×4000 or more. Thus, in order to expose thousands of frames for a motion picture presentation, the spots are exposed at very high speed, with very high precision spot placement accuracy.

It is known to use a galvanometer to control a reflective surface which is used to deflect a light beam. In such an arrangement, a galvanometer is connected to a mirror and moves the mirror, such as in an oscillating motion. In the case of a laser film recorder, the mirror may be used to deflect the laser beam which exposes the film.

When recording a frame of film, the individual pixels or areas which are exposed by the laser beam are arranged in a Cartesian coordinate system. Pixels are arranged in rows (parallel to an "x"-axis) and columns (parallel to a "y"-axis). In order to record each pixel, the laser beam and/or film must be moved in both the "x" and "y" directions.

In prior arrangements, the laser beam is directed over the film in the "x" direction using a mirror controlled galvanometer. The film is then moved in the "y" direction with respect to the beam. Such arrangements have numerous drawbacks which are well known, including complex film drives and controls.

In order to avoid the shortcomings of systems in which the film is moved, some systems have been devised in which a mirror-controlled galvanometer is used to direct the laser beam in one dimension, and then the entire galvanometer is mounted to a rotary head unit for moving the entire device to direct the beam in the other dimension. Such a system is disclosed in U.S. Pat. No. 5,831,757 having the same assignee as herein.

This system constitutes an improvement over prior systems. Still, the rate at which the beams may be scanned over the film using this system was limited due to limitations in controlling the movement of the entire device in the required precise manner. When producing a film having thousands of frames, it is desirable to be able to scan the film as quickly as possible.

In light of the above, Pixar invented a proprietary laser film recording system named Pixarvision™ with solved many of these problems. One specific innovation was the use of two substantially independent galvanometer controlled mirrors to direct the laser beams onto film media in a highly controlled scanning fashion. Previously, laser film recording could take up to 50 seconds per frame, however with Pixar's advances in this technology, this time was reduced to about 5 seconds per frame. Further details regarding specific embodiments may be found in U.S. Pat. No. 6,628,442 assigned to Pixar, the assignee of the present patent application.

In the movie industry, two of the more conventional wide-screen formats for theater screens have horizontal to vertical aspect ratios include CinemaScope (Panavision) (e.g. 2.39:1, 2.40:1, 2.35:1) and widescreen 1.85:1 (e.g. approximately 16×9). In contrast, conventional film stock, such as 35 mm film have large active regions that can support a variety of aspect ratios including approximately 1.2:1 (e.g. 1.18:1). Conventionally, for film projected at CinemaScope aspect ratios, the images are intentionally distorted and recorded in compressed (or expanded) form onto the film media. Looking at the film media, the distorted images appear as horizontally squeezed (or vertically stretched), or "anamorphic" images. In the theater, the anamorphic images are projected through and horizontally stretched (or vertically compressed) by an anamorphic lens. As a result, the image on the theater screen appears at the correct aspect ratio. In contrast, for film having a projected aspect ratio of 1.85:1, the images are recorded onto the film media (stock) with little intentional distortion. Because these images are recorded as non-anamorphic images, no anamorphic lens is required for playback.

Despite these advances, the inventors of the present invention believe that further advances could be achieved in image to film transfer.

BRIEF SUMMARY OF THE INVENTION

The present invention relates to digital image transfer to tangible media. More particularly, the present method relates to apparatus and techniques for increasing digital image to film media transfer speed quality.

According to one aspect of the invention, a method for method for a film transfer device is disclosed. One process includes receiving a digital image in the film transfer device, wherein the digital image comprises a plurality of square pixels, wherein the digital image comprises a first number of pixels in a horizontal direction and a second number of pixels in a vertical direction, and wherein the digital image comprises a non-anamorphic version of an image. Another process includes optically converting the digital image into an optical output image to film media in the film transfer device, wherein the optical output image is associated with a plurality of non-square pixels, wherein the optical output image is associated with the first number of pixels in the horizontal direction and the second number of pixels in the vertical direction, and wherein the optical output image comprises an anamorphic version of the image.

According to another aspect of the invention, another method is disclosed. One technique includes providing a stream of digital data comprising a first image to a laser film recorder, wherein the first image comprises a non-anamorphic image, and optically converting the stream of digital data into a stream of laser modulation signals in the laser film recorder. Another technique includes outputting laser signals in response to the stream of laser modulation signals from the laser film recorder to film media. In various embodiments, a second image is recorded on the film media in response to the laser signals, and the second image comprises an anamorphic representation of the first image.

According to yet another aspect of the invention a film recorder is disclosed. One apparatus includes a plurality of lasers configured to output laser beams, and a plurality of modulators optically coupled to receive the laser beams from the plurality of lasers, wherein the plurality of modulators are configured to receive a stream of digital data signals, wherein the plurality of modulators are configured to modulate the laser beams in response to the stream of digital data signals to form modulated laser beam signals, wherein the stream of digital data signals comprise a first image comprising a non-anamorphic version of a image. The apparatus may also include a mirror assembly coupled to the plurality of modulators configured to direct the modulated laser beam signals towards film media. In one embodiment, the film media records a second image in response to the modulated laser beam signals, wherein the second image comprises an anamorphic version of the image.

BRIEF DESCRIPTION OF THE DRAWINGS

In order to more fully understand the present invention, reference is made to the accompanying drawings. Understanding that these drawings are not to be considered limitations in the scope of the invention, the presently described embodiments and the presently understood best mode of the invention are described with additional detail through use of the accompanying drawings in which:

FIGS. 6A-B illustrate hypothetical examples according to embodiments of the present invention; and FIGS. 6C-D illustrate hypothetical examples according to other techniques.

DETAILED DESCRIPTION OF THE INVENTION

Figure 1:
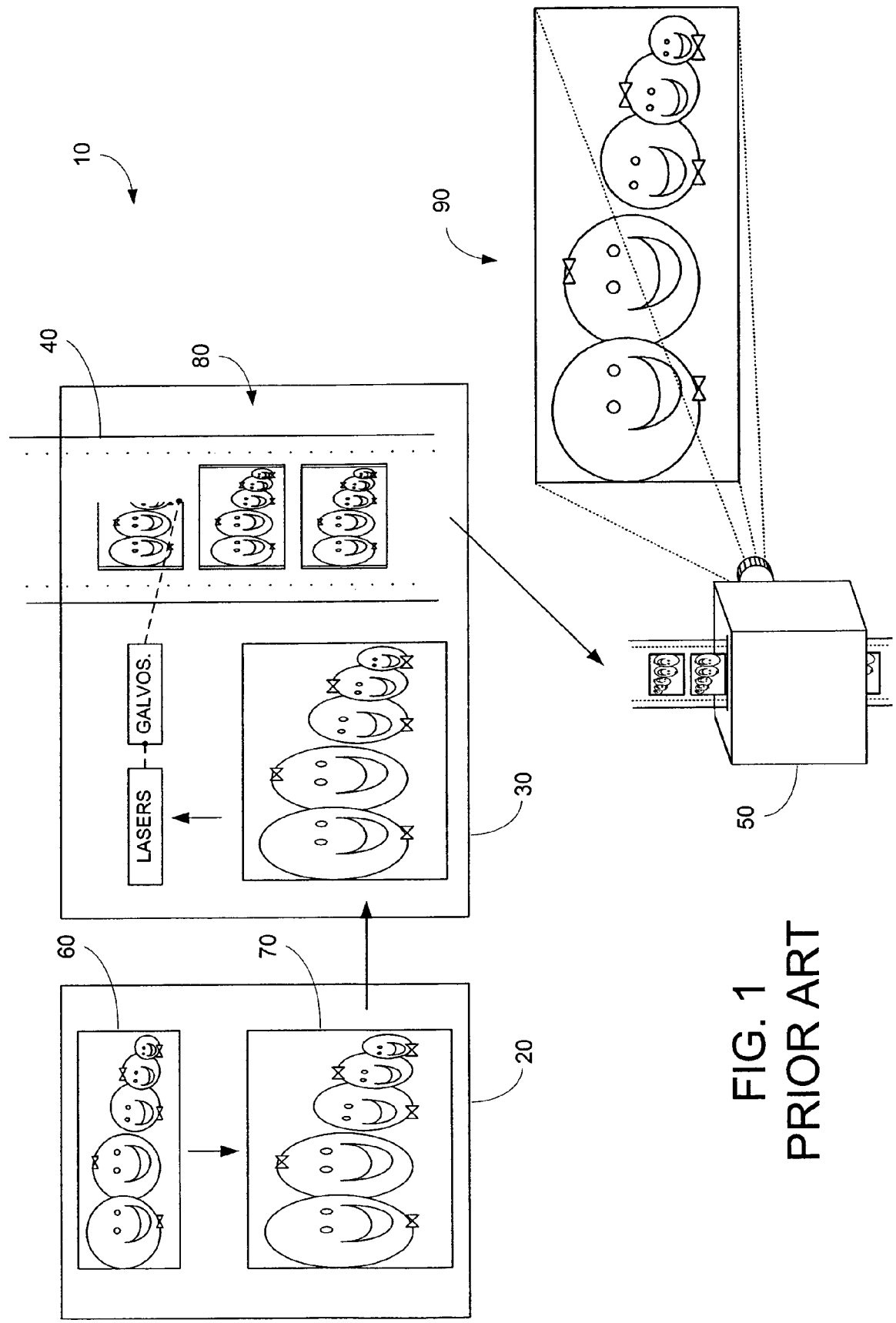
FIG. 1 illustrates a technique developed by the assignee of the present invention.

FIG. 1 illustrates a technique developed by the assignee of the present invention. More specifically, FIG. 1 illustrates a workflow process for forming and recording an anamorphic image on film media. In FIG. 1, a system 10 includes a computer system 20 coupled to a laser film recorder 30, film media 40, and a projector 50.

In this technique, a digital representation of an image 60 is stored on computer system 20. The image may be of a computer-generated image, may be a live-action image, or a combination of a live-action and computer-generated image. The image 60 may have a CinemaScope (Panavision) widescreen aspect ratio such as approximately 2.35:1, 2.40:1, 2.39:1, or the like. In FIG. 1, image 60 is represented with square pixels. As one example, image 60 has a horizontal resolution of approximately 1900 (e.g. 1920) pixels, and a vertical resolution of approximately 800 (e.g. 803) pixels.

Using this technique, computer system 20 vertically resizes image 60 to become image 70. The vertical resizing is performed by computer system 20 using conventional image resizing techniques such as bicubic, bilinear, weighted averaging, and the like. In the example above, image 70 has a horizontal resolution of approximately 1900 (e.g. 1920) pixels, and a vertical resolution of approximately 1600 (e.g. 1606) pixels. Using this technique, image 70 is an anamorphic version of image 60 having a horizontal to vertical aspect ratio of approximately 1.196:1. In FIG. 1, image 70 represents an image having square pixels for sake of convenience.

In another technique, image 60 is horizontally resized to become image 70. More specifically, computer system 20 reduces the horizontal resolution also using conventional image resizing techniques. In the example above, image 70 would have a horizontal resolution of approximately 950 (e.g. 960) pixels, and a vertical resolution of approximately 800 (e.g. 806) pixels. Again, using this technique, image 70 would be an anamorphic version of image 60. This technique is less favored, however, because image 70 would have only about a quarter of the number of pixels than in the vertical resizing technique described above. Accordingly, image 70 would appear less sharp or detailed.

In FIG. 1, image 70 is passed in digital form from computer system 20 to laser film recorder 30. In response to image 70, laser film recorder 30 converts the digital signals into laser beam modulation signals and the modulated laser beams are scanned across film media 40. In FIG. 1, images 80 recorded on film media 40 are also anamorphic images having a horizontal to vertical aspect ratio of approximately 1.2:1 (e.g. 1.196:1).

Subsequently, images 80 stored on film media 40 (or prints thereof) are illuminated and projected through projector 50 to form images 90. In this technique, projector 50 includes an anamorphic lens to unsqueeze images 80. As can be seen in FIG. 1, images 90 have approximately the original widescreen aspect ratio of image 60.

Figure 2:
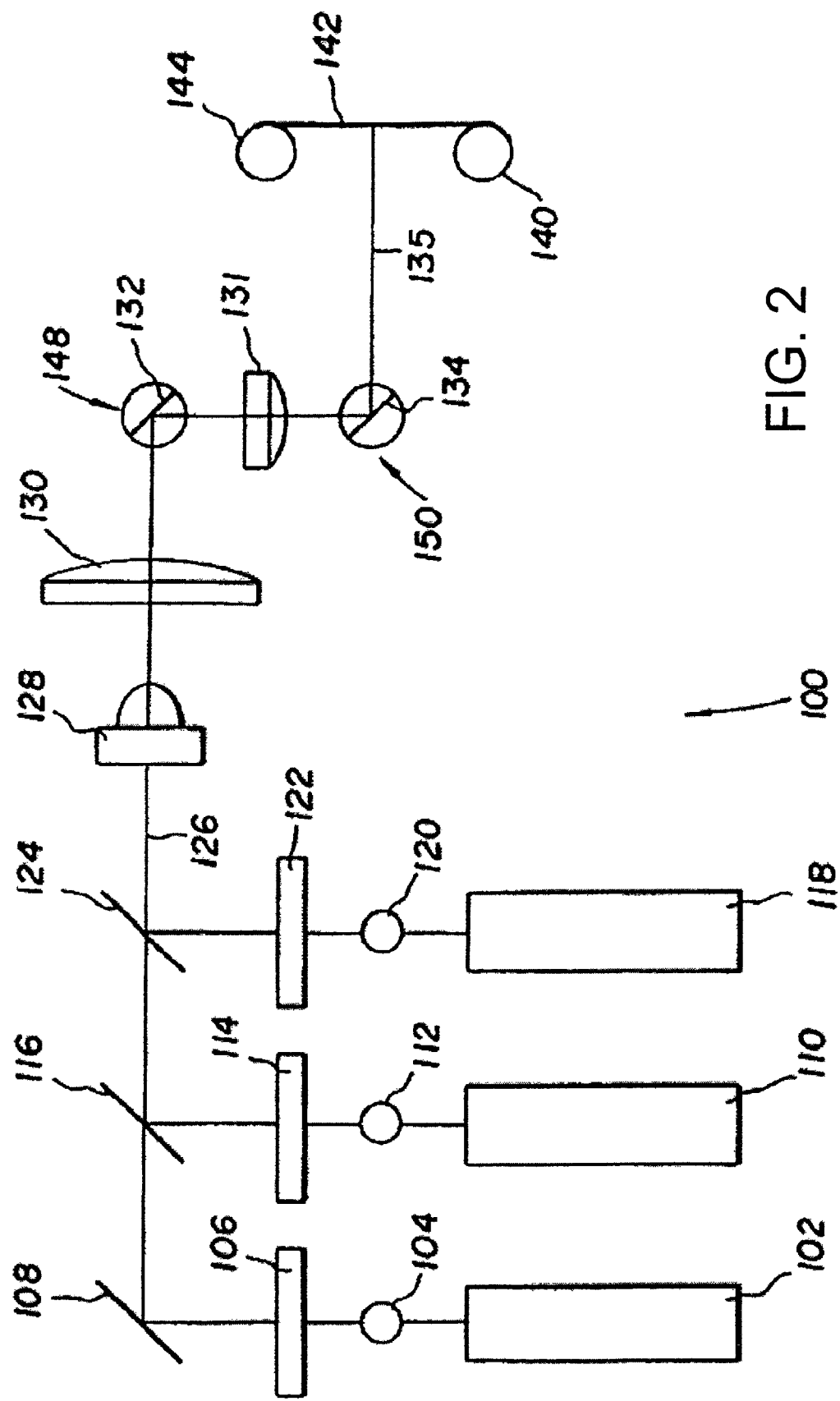
FIG. 2 illustrates a laser film recorder developed by the assignee of the present invention.

FIG. 2 illustrates a laser film recorder developed by the assignee of the present invention. More specifically, FIG. 2 illustrates a laser film recorder 100.

In FIG. 2, a laser 102 produces a red beam that is directed through a modulator 104 and neutral density filter wheel 106 to a mirror 108. A laser 110 produces a green beam that is directed through a modulator 112 and neutral density filter wheel 114 to a beam splitter 116. A laser 118 produces a blue beam that is directed through a modulator 120 and neutral density filter wheel 122 to a beam splitter 124.

Each of the lasers 102, 110, 118 may be of a variety of types now known or later developed. The modulators 102, 112, 120 may be electro-optical modulators, accousto-optical modulators, or any other modulators now known or later developed. The neutral density filter wheels 106, 114, 122 provide variable attenuation of the laser beams. Alternatively, other devices may be used to provide variable attenuation, such as polarizing material or liquid crystal devices.

The mirror 108 directs the red laser beam from red laser 102 along a first optical axis 126. The beam splitter 116 combines the green laser beam from the green laser 110 with the red laser beam along the first optical axis 126. The beam splitter 124 combines the blue laser beam from the blue laser 118 with the red and green laser beams along the first optical axis 126. The mirror 108 and beam splitters 116,124 aid in arranging the system in a compact fashion and allow for precise collinear alignment of the three beams.

The combined beam produced from the red, green and blue beams is directed collinearly through a beam expander 128, which forms the combined beam into the proper size and shape for imaging. After passing through the beam expander 128, the combined beam is directed through a collimating lens 130. The collimating lens 130 directs the combined beam towards a first reflective surface in the form of a first mirror 132.

Figure 3:
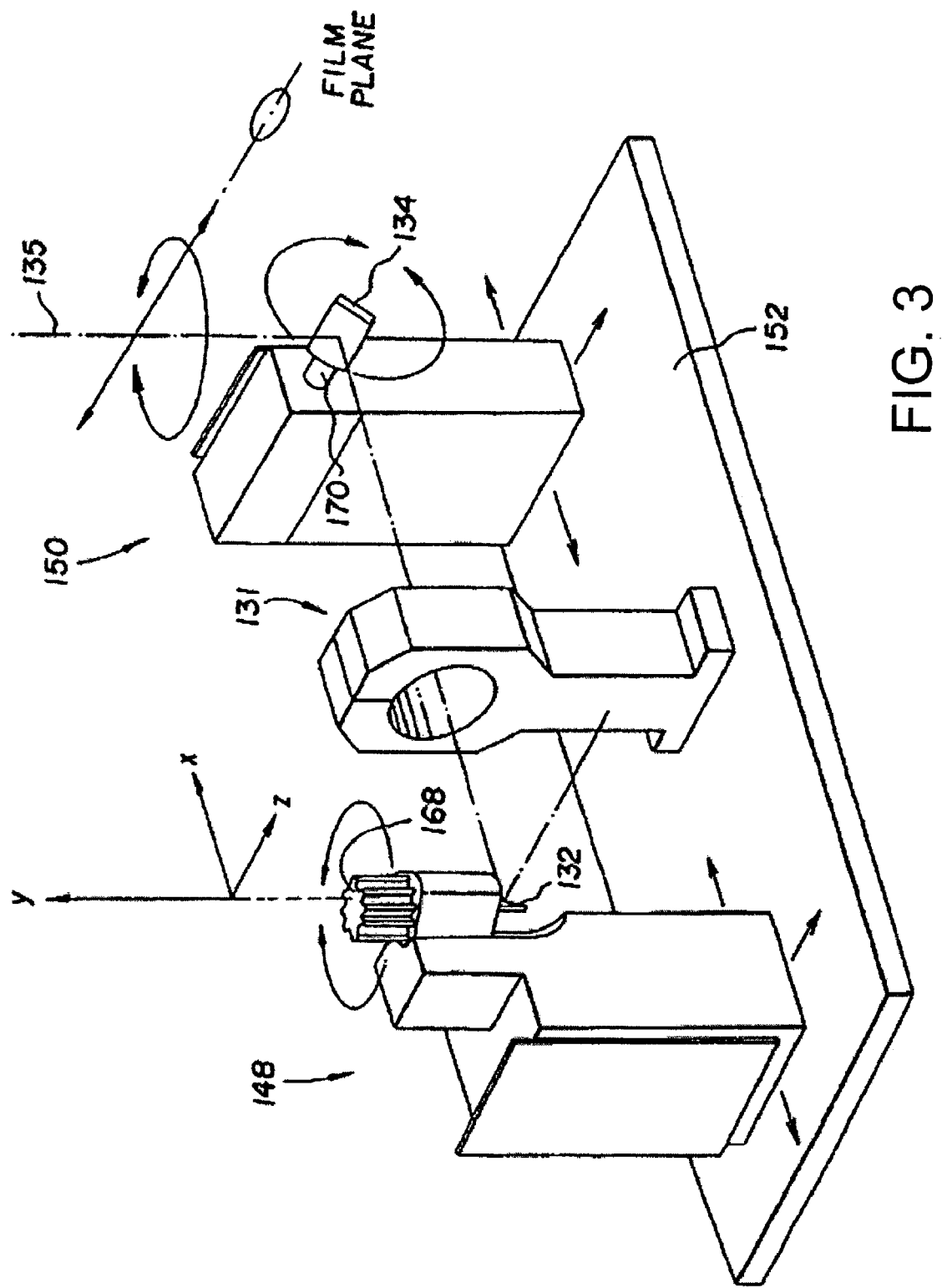
FIG. 3 is a perspective schematic view of de-coupled "x" and "y" scanning galvanometers of the laser film recorder.

The combined beam is deflected off of the first mirror 132 and directed at a second reflective surface in the form of a second mirror 134. In one or more embodiments, and as illustrated in FIG. 3, the deflected combined beam is directed through a scan lens 131. The combined beam is deflected off of the second mirror 134 along a second optical axis 135 to the film plane.

A film transport comprising a film supply reel 140, film plane 142 and film take-up reel 144 is positioned such that the combined beam which is deflected off of the second mirror 134 is directed across the film plane 142. When used to record film, unexposed film is provided on the film supply reel 140. A frame of unexposed film to be exposed is positioned on the film plane 142. The film is exposed by being illuminated by the combined beam. After the frame has been exposed, the film is advanced such that the exposed frame is stored on the take-up reel 144.

The described film recorder 100 is for illustration purposes only, and it will be understood that in one or more embodiments of the invention, the film recorder 100 may vary from that described above.

In accordance with embodiments of the present invention, means are provided for moving the first and second mirrors 132,134 so as to control the direction of the deflected, combined beam. In accordance one embodiment of the invention, a first galvanometer 148 is provided for moving the first mirror 132. A second galvanometer 150 is provided for moving the second mirror 134.

The arrangement of these galvanometers 148,150 and their associated mirrors 132,134 will be described first with reference to FIG. 3. As illustrated therein, the first mirror 132 is mounted for rotation about a "Y"-axis. In such an arrangement, movement of the mirror 132 changes the direction of the deflected, combined beam parallel to an "x" axis (i.e. in an "xz" plane). The second mirror 134 is mounted for rotation about the "z" axis. In such an arrangement, movement of the mirror 134 changes the direction of the deflected, combined beam parallel to the "y" axis (i.e. in a "yz" plane). In this arrangement, the first galvanometer 148 may be referred to as the "x" scanning galvanometer, while the second galvanometer 150 may be referred to as the "y" scanning galvanometer.

The "x" and "y" scanning galvanometers 148,150 may be of a variety of types. The two galvanometers 148,150 are of the bearing-less, flexure or "deflection" type. Such galvanometers 148,150 are known. U.S. Pat. No. 5,280,377 describes one arrangement of a deflection type beam scanning galvanometer. The disclosure of this patent is incorporated herein by reference.

In embodiments of the present invention, the vertical scanning frequency is about 400 Hz, which translates to approximately a modulated laser sweep time of 2.5 milliseconds per vertical column of pixels. Further, in these embodiments, the horizontal scanning frequency is about 0.12-0.18 Hz, thus the time to scan one image onto film media may take from approximately 5 to approximately 8 seconds.

In general, each galvanometer 148,150 has a "motor" for driving or moving it. In one or more embodiments, the motor comprises a driving coil (not shown) associated with a driving magnet (not shown). This type of motor is disclosed in U.S. Pat. No. 5,280,377. When current is applied to the driving coil, the driving magnet rotates against springs or other flexure devices with which the scanning mirror is associated. Applying opposite currents the mirror is moved first in one direction (by rotation of the magnet in one direction) and then in at second direction (by the flexure devices). Further detail regarding film recorder 100 can be found in U.S. Pat. No. 6,628,442, referenced above.

The above techniques and film recorder were used successfully by Pixar for the transfer of digital images to film media for features such as "Finding Nemo" (2003).

Figure 4:
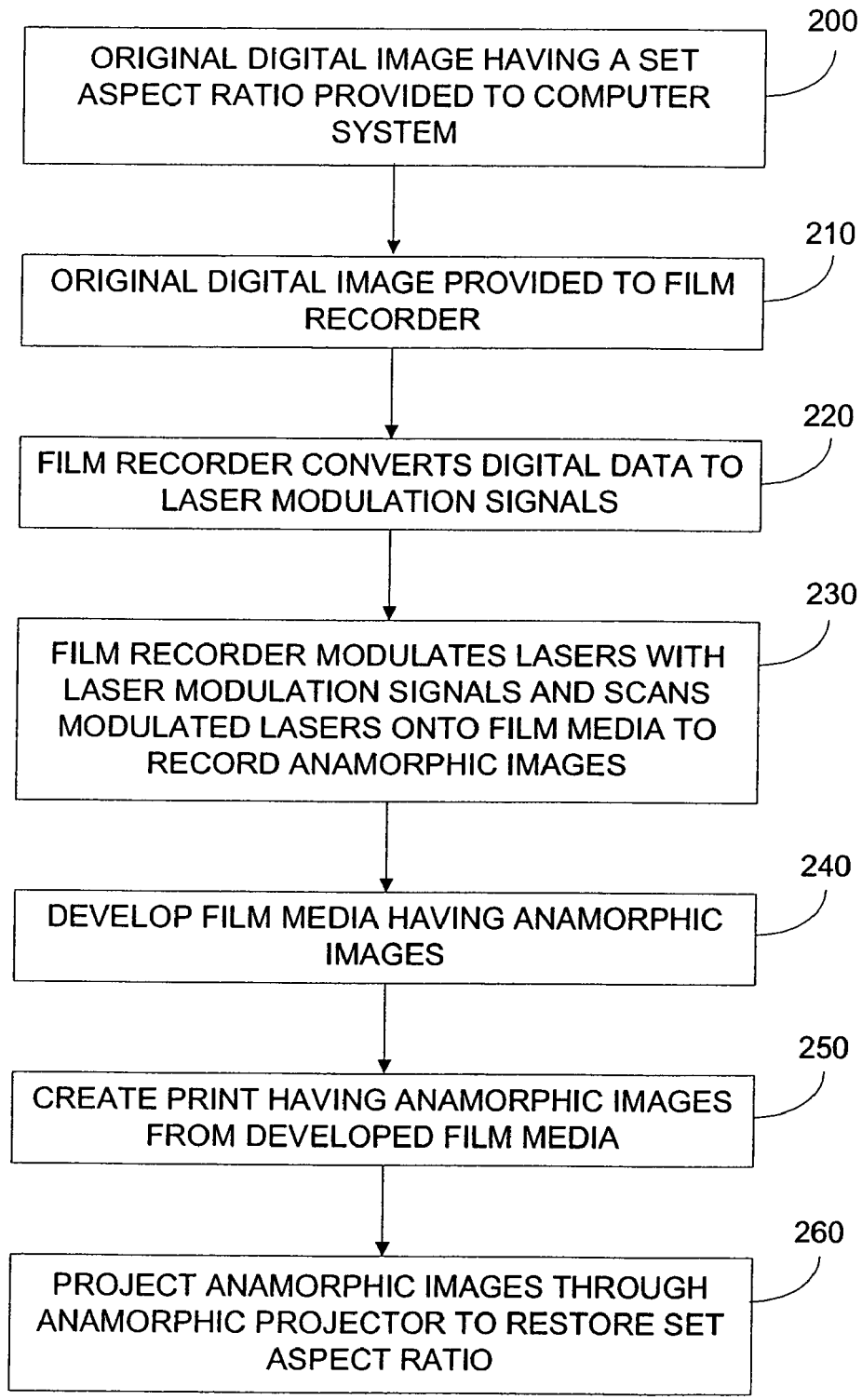
FIG. 4 illustrates a block diagram of a process according to an embodiment of the present invention.

FIG. 4 illustrates a block diagram of a process according to an embodiment of the present invention.

Initially, a digital image is provided within a computer system, step 200. In embodiments of the present invention, the digital image is a computer-generated image, or a live-action image. In the present embodiments, the computer-generated image may be an image from an animated feature that was rendered on the same computer system, on a rendering farm, or the like. Alternatively, the image may be a live-action image that was scanned into the computer system, or a live-action image recorded in a digital format, such as High- Definition (HD), or the like. In other embodiments, the image may be a combination of a live-action image and computer-generated effects (e.g. special effects, or the like).

In embodiments of the present invention, the digital image is characterized by having a horizontal pixel resolution and a vertical pixel resolution. As one example, the digital image has a resolution of approximately 1900 (e.g. 1920) horizontally, and approximately 800 (e.g. 803) vertically. In other embodiments, the horizontal and vertical resolution may be different, for example: 1600×1200, 1920×1080, 1024×768, 1920×1440, 2K×2K, 4K×4K, or the like.

In embodiments of the present invention, the digital image may have "square" pixels, i.e. the horizontal and vertical size of the pixels are approximately equal. In other embodiments, the pixels have a fixed aspect ratio, such as approximately 1.33:1, approximately 1.78:1 or the like.

Next, the digital image is provided from the computer system to a film recorder, step 210. In embodiments of the present invention, the computer system provides the digital image to the film recorder as a stream of data. In other embodiments, the computer system provides a file describing the digital image to the film recorder.

In contrast to the process illustrated in FIG. 1, in this embodiment, the computer system does not digitally resize the digital image before providing it to the film recorder. Because the digital resizing process is omitted from the present workflow, preparing a digital image to send to film media is faster compared to the technique described in FIG. 1.

Additionally, because the digital resizing process is not performed for the digital image, the data transferred to the film recorder is smaller. As an example, a file size of the digital image transferred to the film recorder in the embodiment in FIG. 4 is much smaller (e.g. half) of a file size of the digital image transferred to the film recorder in FIG. 1. Because less data is transferred in this workflow, the present embodiments are much faster than that illustrated in FIG. 1.

In embodiments of the present invention, the amount of time saved by omitting the digital resizing step, and the amount of time saved by transferring smaller files is significant over a large number of frames. As a hypothetical example, the amount of time to resize an image vertically is 2 seconds, and the amount of time saved by transferring the digital image, not a resized digital image, is 0.125 seconds. Then 2.125 seconds multiplied over the number of frames in a feature (e.g. 130,000 frames) comes to about 275,000 seconds, or approximately 77 hours.

In embodiments where there the process is pipelined, the amount of time saved by embodiments of the present invention may be less significant. However, these embodiments are still beneficial as the film recorder will not have modulate the lasers at a higher rate, thus improving film recorder reliability.

In response to the digital image, the film recorder converts the digital image to an optical image, step 220. In various embodiments, the film recorder first buffers the digital image in an internal buffer memory and then provides the laser modulators with signals representing the intensity of the color at specific locations of the film media, step 230. In one embodiment of the present invention, the film recorder typically scans the modulated laser beam signals across the film media one vertical column of pixels at a time until the entire film media has been exposed. For example, in one embodiment, the modulated laser is scanned from bottom to top, and left to right direction across the film media. As discussed in the embodiment above, the film recorder typically scans one vertical column of pixels at a time in the image at a rate of approximately 400 Hz.

In embodiments of the present invention, the rate at which the laser is modulated is decreased from the rate used in the technique described in FIG. 1. For example, in FIG. 1, where an image has approximately 1600 pixels per vertical column, the rate at which the film recorder modulates the lasers is approximately 1 to approximately 2 MHz. In such an example, the rate at which the film recorder reads out data from an internal buffer memory is approximately 1 to approximately 2 MHz, and the rate at which the read-out data is provided to the laser modulator is also approximately 1 to 2 MHz.

In contrast to the technique in FIG. 1, with embodiments of the present invention, the rate at which the film recorder may read out data from an internal memory is lower. For example, where an image has a vertical resolution of approximately 800 pixels, the rate at which the film recorder modulates the lasers is approximately 500 KHz to approximately 1 MHz. In such an example, because the modulation rate is approximately half, the 800 vertical pixels are written in vertical column "designated" for 1600 vertical pixels.

In the present embodiments, the image recorded on the film is approximately characterized by the same horizontal and vertical pixel resolution as the digital image. For example, the image recorded on film may include approximately 1900 horizontal pixels by 800 vertical pixels. However, because the rate at which the lasers are modulated in the vertical direction is decreased, the aspect ratio of the pixels on the film media is different from the digital image. In one example, the horizontal to vertical aspect ratio of the digital image may include square pixels (e.g. about 1:1), and the image recorded on the film are not square (e.g. approximately 1:2.) Accordingly, as will be illustrated below, the digital image is thus recorded onto the film media in anamorphic squeezed form.

Returning to the embodiment in FIG. 4, the exposed film media may be developed, step 240. In various embodiments, the film media may be a camera negative, a camera positive, an internegative, an interpositive, or the like. Subsequently, a print of the developed film may be produced using standard film reproduction techniques, step 250.

The print is then projected through a projector that includes an anamorphic lens, step 260. As is known in the industry, the anamorphic lens reverses the anamorphic squeezed image. Accordingly, the projected image will have a horizontal to vertical aspect ratio of the original image. In one example, if the original image had an aspect ratio of approximately 2.39:1, the projected image will also have a ratio of approximately 2.39:1.

Figure 5:
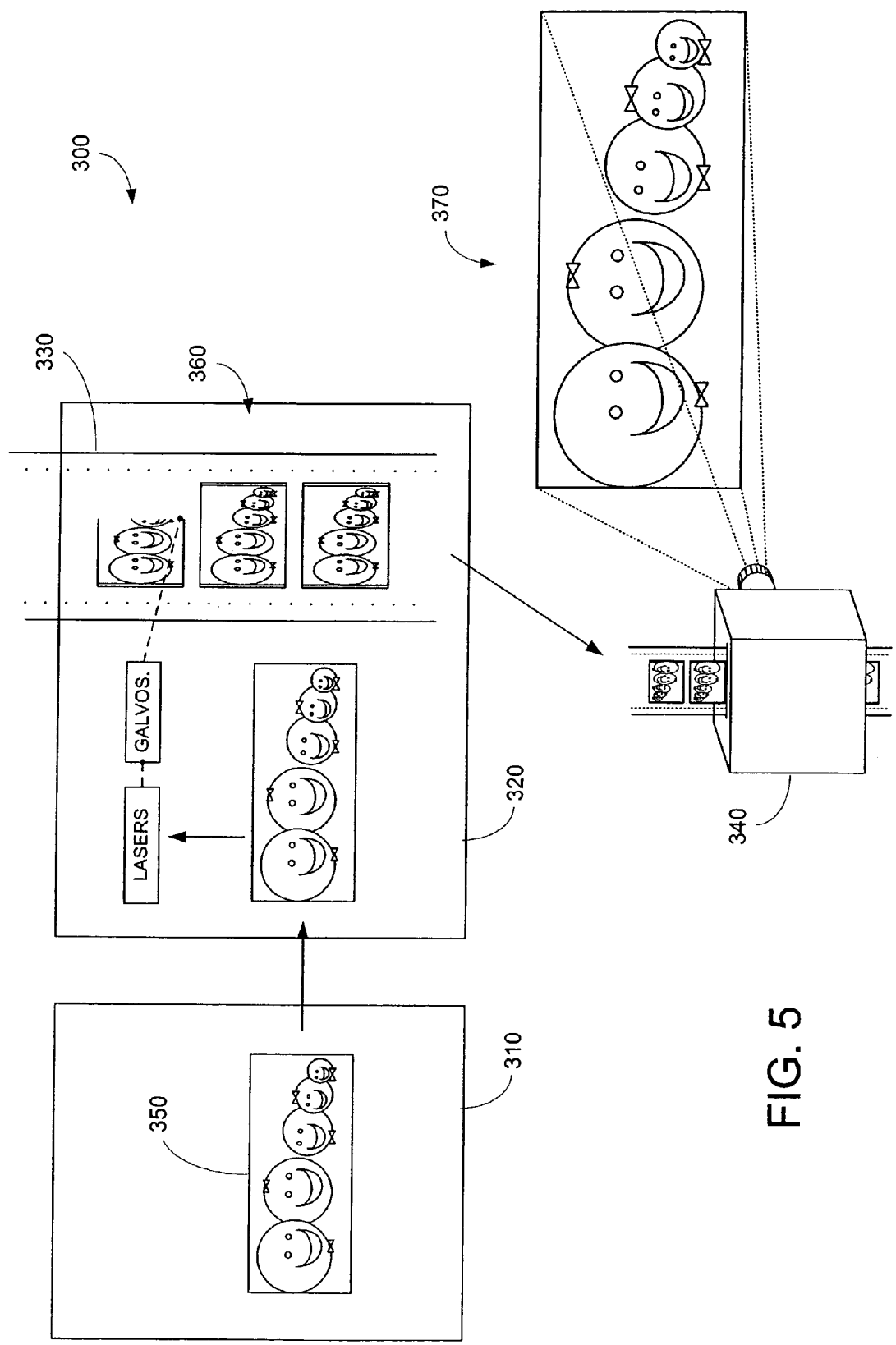
FIG. 5 illustrates an embodiment according to the present invention.

FIG. 5 illustrates an embodiment according to the present invention. More specifically, FIG. 5 illustrates a workflow process for forming and recording an anamorphic image on film media. In FIG. 5, a system 300 includes a computer system 310 coupled to a laser film recorder 320, film media 330, and a projector 340.

In this technique, a digital representation of an image 350 is stored on computer system 310. Again, the image may be of a computer-generated image, may be a live-action image, or a combination of a live-action and computer-generated image. As illustrated, the image 350 may have a widescreen aspect ratio such as approximately 2.35:1, 2.40:1, 2.39:1, or the like. As one example, image 350 has a horizontal resolution of approximately 1900 (e.g. 1920) pixels, and a vertical resolution of approximately 800 (e.g. 803) pixels.

In FIG. 5, image 350 is passed in digital form from computer system 310 to laser film recorder 320. In response to image 350, laser film recorder 320 converts the digital signals into laser beam signals and scans the laser beams across film media 330. As discussed above, laser film recorder 320 scans vertical columns with a slower vertical pixel modulation rate. In FIG. 5, images 360 recorded on film media 330 are thus anamorphic squeezed images.

Subsequently, images 360 stored on film media 330 (or prints of film media 330) are illuminated and projected through projector 340 to form images 370. In this technique, projector 340 also includes an anamorphic lens to unsqueeze images 360. As can be seen in FIG. 5, images 370 have approximately the original widescreen aspect ratio of image 350.

The inventors have determined that additional advantages with the embodiments of the present invention images recorded onto the film media are visibly sharper than the images recorded onto film media using the technique discussed in FIG. 1. Accordingly, the images projected to audiences should also be visibly superior compared to prior techniques.

FIGS. 6A-B illustrate hypothetical examples according to embodiments of the present invention. FIGS. 6C-D illustrate hypothetical examples according to other techniques.

In FIG. 6A, a portion 400 of an original digital image is shown, having a number of pixels in the vertical direction versus intensity. These pixels are illustrated as square-pixels. In FIG. 6C, portion 400 is processed through a resizing filter in the computer system and is shown in portion 410. These pixels can be seen to be non-square-pixels. In FIG. 6C, a "staircase" region 425 of portion 410 is smoothed out as a result of the resizing filter, compared to the "staircase" region 420 of portion 400.

In FIG. 6B, a portion 430 of the image recorded on film in response to portion 400 is shown. In embodiments of the present invention where a moving light source, such as a laser, is used to record light onto a film, the light source tends to integrate the pixel values on the film. For example, as illustrated in portions 440, for example, "pixels" on the film tend to be "ramped" and do not maintain a "flat" value.

In FIG. 6D, a portion 470 of the image recorded on film in response to portion 410 is shown. Again, because of the integrating aspect of a moving laser beam, pixels on the film tend to be more smoothly ramped, as illustrated in portions 480.

The term "pixels" used for FIG. 6B and 6D are for sake of understanding, as these values actually represent film density at specific locations. More specifically, the film density at these locations are determined in response to the modulated laser beam which is driven by digital pixel values described above. Accordingly, the values are not true "pixels" but are values determined as a result of input pixels.

In portion 480 the effect of resizing and the integrating of the pixel values may be advantageous because it tends to smooth-out pixel transitions, e.g. 420. However, in portion 490 the effect of resizing and integrating of the pixel values is also disadvantageous. For example, in FIG. 6A, pixel 500 may represent a line, a part of an alphanumeric character, a surface detail, or the like. As can bee seen in FIG. 6C, portion 450 is slightly degraded due to the resampling, and in FIG. 6D, portion 490 is even more degraded due to the integrating effect. Accordingly, the detail of pixel 500 in FIG. 6A is lost. In FIG. 6B, the detail of pixel 500 is more preserved in portion 460. Because of this, the sharpness of the image in FIG. 6B is perceived to be sharper than the image in FIG. 6D.

In practice, using embodiments of the present invention, the inventors have confirmed that an image recorded on film appears visibly sharper than images recorded on film using other techniques.

In the foregoing specification, the invention has been described with reference to specific exemplary embodiments thereof. Many changes or modifications are readily envisioned. In light of the above disclosure, one of ordinary skill in the art would recognize that other types of image to film transfer devices besides a laser film recorder can be used. For example, the film recorder may include a display, such as an LCD display, CRT display, microdisplay, DLP, or other type of display technology. The film is then exposed from light (LED, strobe, etc.) passing through or emanating from the display or from light reflected from the display. For example, technologies described in co-pending U.S. Application incorporated by reference above may be adapted for use in the present embodiments. In such embodiments, an anamorphic lens may be placed between a display that is driven with the digital image data and the film media such that the anamorphic squeeze is provided by the lens. In other embodiments, fiber optics may provide the anamorphic squeeze effect, changing the data clock of a CRT electron gun may provide the anamorphic squeeze effect, or the like As disclosed above, the anamorphic "squeeze" is a term that is used herein to refer to the distortion of the image recorded on tangible media, such as film. Accordingly, "anamorphic squeeze" refers both to the "stretch" of vertical pixels described above, or a "squeeze" of horizontal pixels, also described above.

In embodiments of the present invention, reference has been made to horizontal and vertical orientation of pixels and scaling of pixels in an image. It should be understood, that these terms are used for convenience and should not limit the scope of the claims. For example, a laser film recorder embodiment can scan one column of vertical pixels at a time, from left to right or right to left. However, in other embodiments, an image transfer device may scan one horizontal row of pixels at a time from top to bottom or bottom to top. In embodiments of the invention, after the image transfer device scans one horizontal row of pixels, the film may move vertically, and the device scans the next horizontal row of pixels, etc. Conversely, the device may scan one vertical row, the film may move horizontally, the device scans the next vertical column, and the like. Accordingly, the horizontal and vertical directions simply refer to directions of pixels that are orthogonal to each other, and the horizontal and vertical directions are not necessarily related to the orientation of the film.

Additional, embodiments of the present invention may also be used for film that is advanced in directions rather than up and down. For example, embodiments may be applied to film media that is advanced in the right and left direction, (e.g. IMAX). In sum, the inventors believe that the anamorphic squeeze techniques described above may be applied to embodiments of the present invention other than those specifically illustrated in the figures above.

In other embodiment of the present invention, the inventors believe that other types of tangible media other than film media can be used, for example, paper, or the like. Further, the techniques described above may be applied to any application where a digital resizing, such as a squeeze or stretch in a direction is desired. One such example may be the generation of anamorphic prints that are used for a variety of purposes, including backgrounds for stop-motion animation, or the like.

In embodiments of the present invention, because the amount of time to perform a film transfer, users now have ability to directly create interpositive or internegative images not only camera negatives. Embodiments provide the capability of recording to intermediate material by increasing the illumination (via light pumps) to the display panel. The practical implications are that fewer film transfer processes or dupes are required between the exposed film media and the release print. Accordingly, release prints will have better quality by at least one or two generations, thereby increasing the quality of the release print and audiences' theatre experience. When recording onto camera film, light pumps may not be necessary.

Embodiments of the present invention, the digital images may be derived from any number of video display formats such as 720i (30 fps), 720p (24 or 60 fps), 1080i (30 fps), 1080p (24 or 60 fps), or the like. Accordingly, the concepts disclosed above are extremely valuable in a variety of applications. Additionally, embodiments can be applied to adjust the aspect ratio of the film in a variety of formats such as: 1.33:1 1.77:1, 1.66:1, 1.85:1, 2.39:1, 2.35:1 or the like, where anamorphic squeeze is desired.

Further embodiments can be envisioned to one of ordinary skill in the art after reading the attached documents. In other embodiments, combinations or sub-combinations of the above disclosed invention can be advantageously made. The block diagrams of the architecture and flow charts are grouped for ease of understanding. However it should be understood that combinations of blocks, additions of new blocks, re-arrangement of blocks, and the like are contemplated in alternative embodiments of the present invention.

The specification and drawings are, accordingly, to be regarded in an illustrative rather than a restrictive sense. It will, however, be evident that various modifications and changes may be made thereunto without departing from the broader spirit and scope of the invention as set forth in the claims.

What is claimed is:

1. A method for a film transfer device comprises:
   receiving a digital image in the film transfer device, wherein the digital image comprises a plurality of pixels having a first horizontal to vertical ratio, wherein the digital image comprises a first number of pixels in a horizontal direction and a second number of pixels in a vertical direction, and wherein the digital image comprises a non-anamorphic version of an image; and
   optically converting the digital image into an optical output image to film media in the film transfer device, wherein the optical output image is associated with a plurality of pixels having a second horizontal to vertical ratio, wherein the first horizontal to vertical ratio is different from the second horizontal to vertical ratio, wherein the optical output image is associated with the first number of pixels in the horizontal direction and the second number of pixels in the vertical direction, and wherein the optical output image comprises an anamorphic version of the image.

2. The method of claim 1 wherein receiving the digital image in the film transfer device comprises receiving a stream of digital data comprising the digital image.

3. The method of claim 1 wherein the first number of pixels in the horizontal direction is approximately 1920.

4. The method of claim 1 wherein a horizontal to vertical aspect ratio of the optical output image is different from the horizontal to vertical aspect ratio of the digital image.

5. The method of claim 1
   wherein the horizontal to vertical aspect ratio of the digital image is selected from the group consisting: approximately 2.35:1, approximately 2.40:1, approximately 2.39:1; and
   wherein the horizontal to vertical aspect ratio of the optical output image is selected from the group consisting: approximately 1.2:1, approximately 1.18:1.

6. The method of claim 1 wherein optically converting the digital image into an optical output image comprises: modulating laser light in response to the digital image; and scanning modulated laser light on the film media.

7. The method of claim 1 wherein optically converting the digital image into an optical output image comprises:
   providing the digital image to an output display device; and
   exposing the film media to an image output from the output display device.

8. The method of claim 1
   wherein the film transfer device comprises a laser film recorder;
   wherein optically converting the digital image into the optical output image to the film media comprises:
      optically converting the digital image into a stream of laser modulation signals in the laser film recorder; and
      outputting laser signals in response to the stream of laser modulation signals from the laser film recorder to the film media.

9. The method of claim 8 wherein the digital image comprises a stream of digital data.

10. The method of claim 8 wherein outputting the laser signals comprises sweeping the laser signals up one vertical column of the optical output image at a time.

11. The method of claim 8 further comprising illuminating the film media through an anamorphic lens to output an illuminated image, wherein the illuminated image comprises a non-anamorphic representation of the first image.

12. The method of claim 1 wherein the first horizontal to vertical ratio is 1:1.

13. The method of claim 12 wherein the second horizontal to vertical ratio excludes 1:1.

14. A film transfer device comprises:
   a receiving portion configured to receive a digital image, wherein the digital image comprises a plurality of pixels having a first horizontal to vertical ratio, wherein the digital image comprises a first number of pixels in a horizontal direction and a second number of pixels in a vertical direction, and wherein the digital image comprises a non-anamorphic version of an image; and
   a conversion portion coupled to the receiving portion, wherein the conversion portion is configured to optically convert the digital image into an optical output image to film media, wherein the optical output image is associated with a plurality of pixels having a second horizontal to vertical ratio, wherein the first horizontal to vertical ratio is different from the second horizontal to vertical ratio, wherein the optical output image is associated with the first number of pixels in the horizontal direction and the second number of pixels in the vertical direction, and wherein the optical output image comprises an anamorphic version of the image.

15. The film transfer device of claim 14 the digital image comprises a stream of digital data comprising the digital image.

16. The film transfer device of claim 14 wherein the first number of pixels in the horizontal direction is approximately 1920.

17. The film transfer device claim 14 wherein a horizontal to vertical aspect ratio of the optical output image is different from the horizontal to vertical aspect ratio of the digital image.

18. The film transfer device claim 14
   wherein the horizontal to vertical aspect ratio of the digital image is selected from the group consisting: approximately 2.35:1, approximately 2.40:1, approximately 2.39:1; and wherein the horizontal to vertical aspect ratio of the optical output image is selected from the group consisting: approximately 1.2:1, approximately 1.18:1.

19. The film transfer device claim 14 wherein the conversion portion comprises:

a laser configured to output laser light;

a modulator coupled to the laser, wherein the modulator is configured to modulate the laser light to form modulated laser light in response to the digital image; and a scanner coupled to the modulator, wherein the scanner is configure to scan the modulated laser light on the film media.

20. The film transfer device claim 14 wherein the conversion portion is configured to providing the digital image to an output display device, and wherein the conversion portion is configured to expose the film media to an image output from the output display device.

* * * * *